(12) United States Patent
Graves et al.

(10) Patent No.: US 6,568,647 B2
(45) Date of Patent: May 27, 2003

(54) MOUNTING APPARATUS FOR A DEFORMABLE MIRROR

(75) Inventors: J. Elon Graves, Kailua, HI (US); Malcolm J. Northcott, Kailua, HI (US)

(73) Assignee: AOptix Technologies, Inc., Campbell, CA (US)

(*) Notice: Subject to any disclaimer, the term of this patent is extended or adjusted under 35 U.S.C. 154(b) by 20 days.

(21) Appl. No.: 09/769,874

(22) Filed: Jan. 25, 2001

(65) Prior Publication Data

US 2002/0097509 A1 Jul. 25, 2002

(51) Int. Cl.[7] .................................................. A47G 1/24
(52) U.S. Cl. .................. 248/476; 248/288.51; 359/845; 359/847
(58) Field of Search .............................. 248/476, 477, 248/481, 346.06, 315, 549, 371, 527, 288.51; 359/845, 819, 224, 847; 324/758

(56) References Cited

U.S. PATENT DOCUMENTS

| | | | | |
|---|---|---|---|---|
| 3,836,236 A | * | 9/1974 | Kirk et al. .................. 350/310 |
| 3,897,139 A | * | 7/1975 | Caruolo et al. ............. 350/288 |
| 4,266,857 A | * | 5/1981 | Svenson ...................... 359/845 |
| 4,734,557 A | * | 3/1988 | Alfille et al. ................ 359/847 |
| 5,249,197 A | * | 9/1993 | Kittell ......................... 372/107 |
| 5,617,261 A | * | 4/1997 | Bar et al. .................... 349/845 |
| 5,763,965 A | * | 6/1998 | Bader .......................... 310/12 |
| 5,797,228 A | * | 8/1998 | Kemeny ..................... 52/167.7 |
| 5,880,894 A | * | 3/1999 | Blakley ....................... 359/819 |
| 5,896,234 A | * | 4/1999 | Miyamoto et al. .......... 359/819 |
| 6,305,657 B1 | * | 10/2001 | Manpuku et al. ........... 248/371 |

* cited by examiner

Primary Examiner—Leslie A. Braun
Assistant Examiner—Tan Le
(74) Attorney, Agent, or Firm—Fenwick & West LLP

(57) ABSTRACT

A mounting apparatus for a deformable mirror that has a peripheral mounting portion with oppositely facing and parallel mounting surfaces. A base member and a mounting ring have juxtaposed peripheral flange portions with rubber o-rings for engaging the parallel mounting surfaces of the mirror. A plurality of set screws are provided in the base member and the mounting ring in the peripheral flange portions and engage the o-rings for applying and adjusting a mounting force to the mounting surfaces of the mirror. The base member is also provided with set screws in the perimeter for engaging and centering the mirror.

16 Claims, 2 Drawing Sheets

MOUNTING APPARATUS FOR A DEFORMABLE MIRROR

The present invention relates to a mounting apparatus for mounting a deformable curvature mirror of the type that is capable of controlled deformation by the application of electrical voltages to mirror electrodes on the back side of the mirror with the voltages controlled by the use of a wavefront sensor in an adaptive optics system.

There are various adaptive optics methods and devices which include a wavefront sensor for sensing the aberrations in the wavefront of light waves and then correcting or compensating for those aberrations, such as the atmospheric aberrations that effect the viewing of stars and planets through a telescope. The existing methods and devices for sensing and measuring the wavefront include several interferometric techniques, the Shack-Hartmann wavefront sensing techniques and various other systems involving the projection of patterns of light through an optical system. Such prior techniques and systems are typically complex and expensive, as well as having various inherent deficiencies. In addition to the deficiencies of the prior art wavefront sensors, the deformable mirrors that are controlled by those wavefront sensors for adaptive optics also include numerous deficiencies. For example, the Shack-Hartmann system mirror is comprised of a multiplicity of push rods engaging the back of a flexible mirror and the extension-retraction of each push rod is controlled by the Shack-Hartmann wavefront sensor, but the push rods tend to produce a straight line on the mirror surface between each pair of adjacent push rods that is not truly representative of the curvatures of a wavefront. Moreover, the number of push rods and, therefore, the closeness of the push rods is physically limited, as well as the length of their travel, whereby the accuracy and degree of optical correction that can be applied by the Shack-Hartmann type mirror is limited. Further, some other wavefront sensing and deformable mirror techniques and devices are not directly applicable to all types of adaptive optics for correcting the wavefront to thereby correct the image.

A deformable curvature mirror that solves many of the problems of the prior art deformable mirrors has been developed by the inventors hereof and is the subject of separate, concurrently filed U.S. patent application entitled "Deformable Curvature Mirror", which mirror is useable in an adaptive optics system having a wavefront sensor described and shown in the copending U.S. patent application Ser. No. 09/579,786, filed May 26, 2000, issued on Sep. 17, 2002, as U.S. Pat. No. 6,452,145, by the inventors hereof. While such deformable curvature mirror and wavefront sensor greatly improve the capabilities of an adaptive optics system, it has been discovered that the mounting of the unique deformable curvature mirror is critical to optimizing the performance of that mirror. Briefly, the deformable curvature mirror of the inventors' copending patent application is comprised of a laminate of two electro-restrictive disks, such as of PZT material, with a mirrored layer on one side, a pattern of electrodes on the opposite side and an electrically grounded metallic layer sandwiched therebetween, whereby the application of variable electric voltages to the electrodes causes controlled expansion and contraction of the electro-restrictive material to thereby controllably deform the mirror surface. However, since the expansion and contraction of the electro-restrictive material to thereby deform the laminated disks must e precisely controlled, the proper mounting and support of the laminated disks is critical to avoiding undesirable mechanical deformation of the laminated disks during mounting and also to allow the desired deformation of the laminated disks by the applied voltages. Moreover, since the laminated disks of the deformable curvature mirror are subjected to various plating and heating steps, it is virtually impossible to produce a completely flat mounting surface on the mirror from which it can be supported.

In summary, it is an object of the present invention to provide a novel mounting apparatus for a deformable curvature mirror for fixedly supporting a peripheral portion of the mirror between pliable means with means for selectively adjusting the mounting force applied by the pliable means. A further object of the present invention is to provide such a mounting apparatus whereby opposed adjustable means are provided on opposite sides of the peripheral portion of the mirror at a plurality of locations for selectively adjusting the mounting force and direction applied to the mirror perimeter at each such location, including for purposes of mechanically flattening the deformable curvature mirror from its as-manufactured condition. A still further object of the present invention is to provide such a mounting apparatus having a plurality of adjustable screws on opposite sides of the deformable curvature mirror, which screws engage a rubber o-ring on each side of the mirror perimeter for adjustably and firmly mounting the mirror by selectively advancing and retracting individual screws.

Other and more detailed objects and advantages of the present invention will appear to those skilled in the art from the following detailed description of the preferred embodiments thereof in conjunction with the drawings, wherein.

Figure 1:
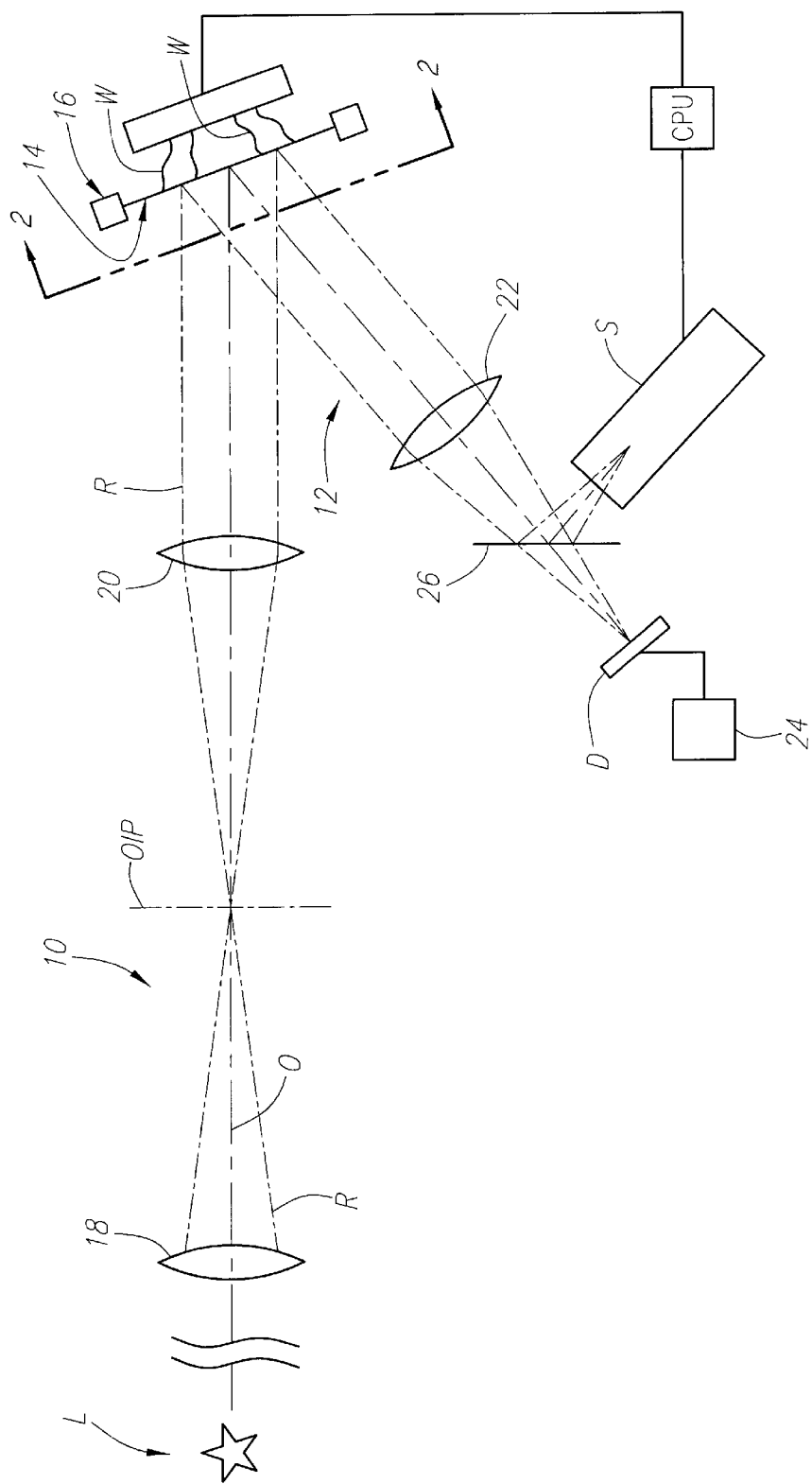
FIG. 1 is a diagrammatic illustration of a typical optical system, namely, a telescope, provided with an adaptive optics system that includes the deformable curvature mirror mounting apparatus of the present invention.

Referring now to FIG. 1, a simplified form of an optical system, such as a telescope 10, is illustrated with an adaptive optics system, generally designated 12, that includes the deformable curvature mirror 14 supported by the mounting apparatus 16 of the present invention. Light rays R from any light source L, such as the illustrated star when the telescope 10 is used for observing stars and planets, enter the telescope 10 through a lens 18 that focuses the light rays on an object image plane OIP where the image of the light source L (here a star, for example) exists in focus but is uncollected. The telescope 10 also may be of a type and construction for receiving light waves from an earth-bound data transmission station L, such as in a system for transmitting data from building-to-building, tower-to-tower or mountain-to-mountain.

The light rays R then pass through a collimating lens 20 to the deformable mirror 14. Thus, in FIG. 1, the light rays R reaching the telescope 10 from a distant star or other light source L, theoretically would be parallel and in perfect alignment to produce a flat wavefront. However, as is well known to astronomers, the earth's atmosphere creates aberrations in the light rays R before reaching the telescope 10, which aberrations vary with the atmospheric conditions and rapidly over any period of time, even when the telescope is located at high elevations. Similarly, if the telescope 10 is used for viewing something on earth at a distance or for receiving light waves for data transmission from a station at a distance on earth, the earth's atmosphere will create aberrations in the light rays R and, therefore, produce a wavefront that is not perfectly flat and is constantly changing when it reaches the telescope 10 and the deformable mirror 14. Various wavefront sensors have been used to detect the variations in the wavefront caused by the atmospheric aberrations and then to compensate or correct for those aberrations by adaptive optics, such as by using a deformable mirror controlled by a wavefront sensor. One type of wavefront sensor that is particularly suited for use with the deformable curvature mirror 14 described and shown in the concurrently filed U.S. patent application, Ser. No. 09/769,988, filed Jan. 25, 2001, issued on Oct. 15, 2002, as U.S. Pat. No. 6,464,364, by the inventors hereof is a wavefront curvature sensor that uses a pair of defocused pupil images as described and shown in the copending U.S. patent application, Ser. No. 09/579,786, filed May 26, 2000, issued on Sep. 17, 2002, as U.S. Pat. No. 6,452,145, by the inventors hereof, which patent applications are both incorporated herein by this reference.

In such an adaptive optics system 12, the light rays R reflect from the surface of the deformable mirror 14 to a lens 22 that refocuses the image on the plane of an image detector D. The lens 18, collimating lens 20, deformable mirror 14, lens 22 and image detector D are all located and centered on the optical axis O of the system. The image detector D may be of any convenient type that is suitable for the particular application of the system, such as a conventional detector in a video camera, a custom format of charge couple device (CCD), an array of PIN diodes, an array of lenslets focusing the light onto a like array of optical fibers, photon counting detectors, any digital photo detector, photo transmitter, or the like. The detector D provides images and/or data relative to the light intensity throughout the image focused on detector D and these images and/or data are displayed and/or recorded by an appropriate device 24 suitable for the particular application of the system. When the deformable mirror 14 is perfectly flat, the image sensed by image detector D will be the uncorrected image entering the telescope 10, i.e. without correction for aberrations, but when the deformable mirror 14 is appropriately deformed in the manner described in the aforesaid patent applications to compensate for the aberrations, the image detector D will detect and convey to the device 24 an image that eliminates the aberrations, i.e. a corrected image. Similarly, if the system is used for data transmission by light waves, the detector D will receive and detect corrected light rays when the deformable mirror 14 is properly deformed to correct for aberrations in the light rays R transmitted to the system illustrated in FIG. 1. Further, when such a system is used for transmitting data by light rays, the wavefront can be sensed and corrected by the deformable mirror 14 before transmitting the light rays with the data light emitter positioned at the same location as image detector D.

A prism or partial mirror 26 is positioned on the optical axis O between lens 22 and detector D for reflecting a portion of the light rays R to a wavefront sensor S, such as one of the wavefront sensors disclosed in the inventors' aforementioned copending U.S. patent application Ser. No. 09/579,786. In the preferred embodiment of the system employing the preferred deformable curvature mirror 14, the wavefront sensor S senses two defocused pupil images (or the shapes and light intensities for some detectors used in a wavefront sensor S) which are communicated to the central processing unit CPU for processing by data reduction software to derive the wavefront curvature and provide data appropriate for the operation of the deformable mirror 14. Specifically, as is well known in the art, the wavefront is derived or recovered by solving the Poisson equation with respect to intensities with the Dirichlet's boundary conditions relative to the shape. An iterative data reduction algorithm or other non-linear fitting technique may be employed to compensate for non-linearity in measurements in an open loop system. The CPU then provides a plurality of separate and controlled high voltage electrical potentials to a plurality of conductive electrode segments (described below) on the back of deformable mirror 14 through a like plurality of separate wires W. The deformable mirror 14 is fixedly mounted in the mounting apparatus 16 of the present invention that is appropriately positioned to reflect the optical axis O and light rays R from the collimating lens 20 to the detector D. With the preferred embodiment of the deformable mirror 14, the overall surface shape of the mirror can be modified by the application of high voltages applied to selected electrode segments of the deformable mirror 14 through one or more of the wires W and the curvature of the surface of the deformable mirror 14 may be modified for correcting aberrations by the application of controlled high voltages through other ones of the wires W.

Figure 2:
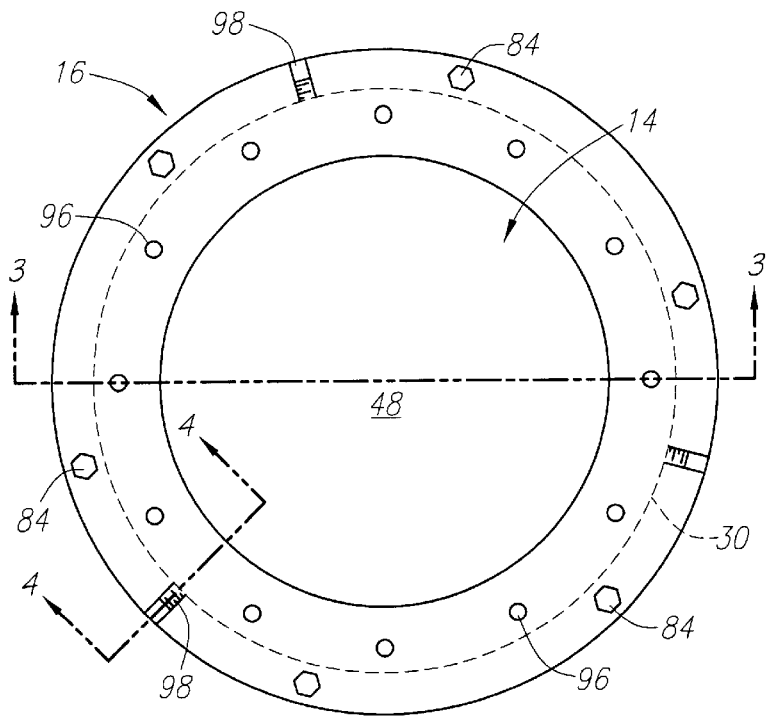
FIG. 2 is an enlarged plan view of the mounting apparatus for the deformable mirror of the present invention taken on the line 2—2 in FIG. 1.
Figure 3:
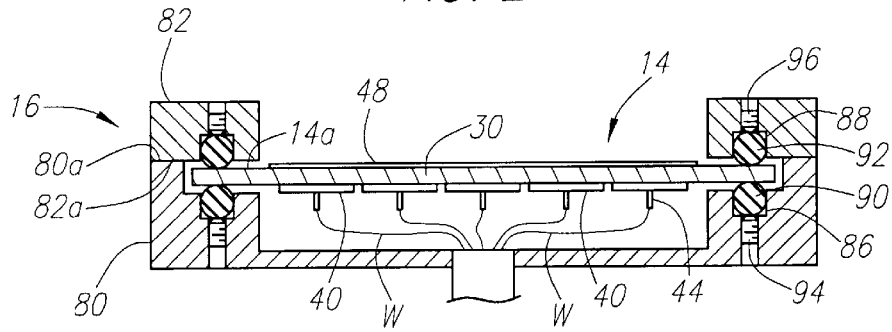
FIG. 3 is a sectional elevation view of the mounting apparatus taken substantially on the line 3—3 in FIG. 2.

Referring now to FIGS. 2 and 3, the deformable curvature mirror 14 is shown in a top plan view (FIG. 2) and a sectional view (FIG. 3) diagrammatically with the thicknesses of some of the layers of the laminated construction exaggerated for ease of illustration and some layers omitted for clarity. The basic, physical structure of the deformable mirror 14 is comprised of two disks or plates of any electro-restrictive material that exhibits controlled expansion and contraction in response to the application of an electrical potential across the material and yet the material has an adequate structural strength and rigidity to maintain a given shape, as distinguished from being flexible. A preferred material is PZT, which is a piezoelectric material comprised of Pb, Zu, Ti and O though a possible alternative is a magnetorestrictive material known as PMN comprised of Pb, Mg, Nb and O. The plates of the electro-restrictive material are separately ground to produce flat surfaces and a uniform thickness that depends on the size of the deformable mirror 14 but, in general, sufficiently thin to accommodate the flexures caused by the expansion and contraction induced by the electrical voltages. For example, in a deformable mirror 14 of about 6 inches in diameter, each of the PZT plates 30 and 32 preferably would be less than one-quarter inch and more than one-sixteenth inch in thickness. A layer of gold or other highly conductive material (hereinafter referred to as a gold layer for convenience) is applied to the facing surfaces of the two plates and then the two plates are laminated together and joined by a conductive adhesive to form a laminated disk 30.

Figure 5:
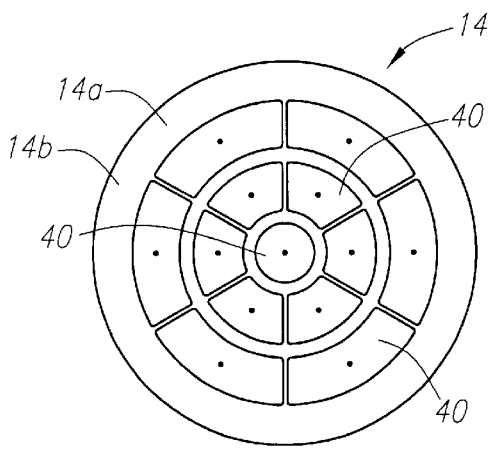
FIG. 5 is a bottom view, on a reduced scale, of a typical deformable curvature mirror separated from the mounting apparatus of the present invention for clarity of illustration.

After the two plates are bonded together to form laminated disk 30, a plating mask (not shown) is applied to the bottom surface to create a predetermined pattern, such as the typical pattern shown in FIG. 5, and then gold layers are applied to the top and bottom surfaces of the disk. The mask and gold covering the mask on the bottom surface are removed to leave a pattern of gold electrodes 40 that are separated by small gaps formed by the mask. Electrical terminals 44 are connected to each electrode 40 and the wires W are connected to the terminals for selectively supplying the variable high voltage to the electrodes 40 for causing the controlled deformation of the laminated disk 30. A ground wire is connected to the upper and intermediate gold layers to complete the electrical circuit. A ground wire (not shown) is connected to the upper and intermediate gold layers to complete the electrical circuit (not shown).

A mirror layer 48 is applied to the upper surface of laminated disk 30 by any convenient means such as epoxy replication wherein the mirror layer 48 is first formed separately and then adhered to the upper surface. As an alternative to a separate mirror layer 48, the outer surface of gold (or other metal) layer on the upper surface may be polished to a mirror-like condition, which may be adequate for some applications of the deformable mirror 14.

As thus far described, it may be seen that in one preferred embodiment of the mirror 14 is disclosed wherein the upper and intermediate gold layers are all connected to ground and a positive or negative voltage may be applied to one or more of the wires W. Then at each electrode location an electric field is produced across the rear plate in proportion to the voltage that is applied. The mirror then bends as the result of an expansion or contraction of the rear plate against the front plate. The resulting bending moment produces curvature. By grounding the front plate undesirable thermal behaviors are avoided. By grounding both sides of the front plate, it will have the same thermal expansion characteristics as the rear when connected to a drive amplifier.

As noted above, the mounting support for the deformable curvature mirror 14 is important to the optimum performance of the mirror because it effects both the dynamic and static properties of the mirror. Additional benefits arise when the mount can be used to tune out manufacturing flaws, such as astigmatism. By providing a nearly continuous support around the edge, the first resonant frequency is confined to the first mode in the Bessel series for a drum head, which is pure focus. By the use of only three points this is not true the deformations caused by the edge actuators will have more stroke when they have something to push against, thereby greatly improving the mirror performance in correction tip/tilt, astigmatism, or any other wavefront errors with large slope terms.

Figure 4:
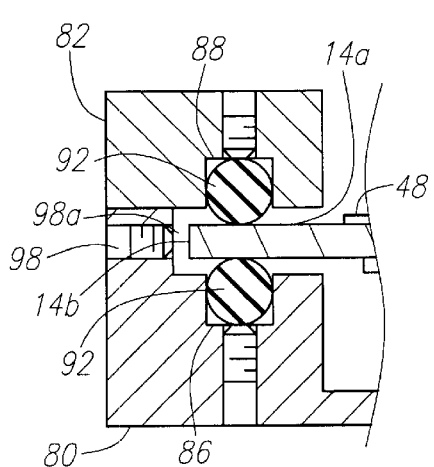
FIG. 4 is an enlarged, fragmentary sectional view taken substantially on the line 4—4 in FIG. 2.

The mounting apparatus 16 of the present invention is illustrated in the drawings as being circular for mounting a round deformable curvature mirror 14 but it should be understood and will be readily apparent to those skilled in the art that the mirror 14 may be of a non-round shape for non-spherical optical applications, such as for lasers, whereby the mirror 14 and the mounting apparatus 16 may be of a square, rectangular, oval or other non-round shape. The deformable curvature mirror 14 includes a peripheral mounting portion 14a around the perimeter of the mirror 14 that is of an adequate width for mounting the mirror and has substantially parallel opposite sides. The peripheral mounting portion 14a is radially beyond the pattern of electrodes 40, as shown in FIG. 5, and radially beyond the mirror layer 48, as shown in FIGS. 3 and 4, for supporting the mirror 14 directly on the laminated disk 30 rather than any portion of the mirror or electrodes.

The mounting apparatus 16 includes a base member 80 and a mounting ring 82 superimposed on the base member 80 with mating annular surfaces 80a and 82a. In the final assembly, the mating surfaces 80a and 82a are in full engagement and the mounting ring 82 is rigidly connected to the base member 80 by any convenient means, such as a plurality of threaded bolts 84.

The base member 80 is provided with an annular groove 86 in a recessed peripheral portion of the base member 80 radially inward from the mating surface 80a. A peripheral portion of the mounting ring 82 is provided with a similar groove 88 of the same diameter so that groove 88 is directly above groove 86, as shown in FIGS. 3 and 4. Pliable means, such as o-rings 90 and 92, are positioned in grooves 86 and 88, respectively, and are of a sufficient thickness to extend above the surfaces of the respective grooves both before the base member 80 and mounting ring 82 are assembled and during all adjustments thereof. In other words, the grooves are of a depth significantly less than the thickness or height of the o-rings 90 and 92. While rubber o-rings 90 and 92 have been shown and described as the pliable preferable means, any flexible or compressible means may be used. In fact, although it is preferred that the pliable means extend continuously around the perimeter, as a rubber o-ring does, individual or segments of pliable means that extend only a limited circumferential distance may also be used. A plurality of set screws 94 are threadedly mounted on the base member 80 in alignment with the groove 86 and circumferentially spaced around the base member. A like plurality of set screws 96 are threadedly mounted in the mounting ring 82 and preferably directly opposite the set screws 94. For a deformable curvature mirror of about six inches in diameter, it has been found that approximately twelve pair of set screws 94, 96 are effective and adequate for the required adjusting, as described below, but less or more set screw pairs may be used for that size mirror and would be appropriate for other sizes of mirrors. Further, while set screws are preferred, in part to inhibit unauthorized adjusting thereof, bolts or any other adjustable means may be used.

For mounting the deformable curvature mirror 14 in the mounting apparatus 16, the bolts 84 are removed and the mounting ring 82 is separated from the base member 80. The wires W are fed through the bottom of the base member 80, such as into a conduit, and the mirror 14 is positioned in the base member 80 within the recessed portion, which is of a larger outer diameter than the outside diameter of the mirror 14 to allow centering of the mirror 14 in the base member 80. The diameter of the o-ring groove 86 is less than the outer diameter of the mirror 14 such that the o-ring 90 engages the peripheral mounting portion 14a of the mirror. The mounting ring 82 is positioned on the base member 80 with the o-ring 92 engaging the other side of the peripheral mounting portion 14a of the mirror 14 and the bolts 84 are installed. The mirror 14 is centered in the mounting apparatus 16 before the bolts 84 are completely tightened and a plurality of set screws 98 that are provided in the perimeter of the base member 80 are advanced to engage the perimeter edge 14b of the mirror to maintain the mirror in the centered location. The perimeter set screws 98 preferably have a soft tip, such as nylon tip 98a, for resiliently engaging the perimeter of the laminated disk 30 portion of the mirror to avoid inducing an excessive stress in the somewhat brittle electro-restrictive material. The bolts 84 are then tightened so that the surfaces 80a and 82a are firmly engaged. In this assembled condition, the vertical dimensions (perpendicular to the plane of the mirror 14) of the base member 80, mounting ring 82, grooves 86, 88, o-rings 90, 92 and peripheral mounting portion 14a are such that the o-rings 90, 92 are slightly compressed for firmly but resiliently supporting the peripheral mounting portion 14a of the mirror with the set screws 94 and 96 completely retracted.

With the mirror 14 centered and the bolts 84 tightened to securely join the base member 80 and mounting ring 82, the set screws 94 and 96 may be advanced and retracted to properly support and securely mount the mirror 14 by the peripheral mounting portion 14a. It is preferred that opposing pairs of set screws 94, 96 be adjusted concurrently so that an appropriate resilient force is applied to both sides of the peripheral mounting portion 14a at the location of each pair of set screws 94, 96 rather than, for example, making all of the adjustments by only the set screws 94 or 96 on one side of the mounting apparatus 16. However, it is to be understood and will be apparent to those skilled in the art that in some adaptive optics installations an adequate amount and control of the adjustable mounting may be achieved by having adjustment screws on only one side of the mirror although it will be less precise and controllable. By positioning the mounting apparatus 16 and mirror 14 in an appropriate adaptive optics system, such as one similar to the optical system shown in FIG. 1, having a controlled light source, wavefront sensor, detector and optics, the mounting of the deformable mirror 14 in the mounting apparatus 16 may be adjusted by the set screws 94, 96 to achieve the optimum surface configuration of the mirror 14 that is achievable by mechanical means, i.e. without the application of voltages to the electrodes 40. It should be noted that some optical designs required that the surface configuration of the mirror be flat while other optical designs preferably require some other shape. Then, the wavefront sensor and controls, such as a wavefront sensor S and CPU, may be used to apply controlled voltages selectively to one or more of the plurality of electrodes 40 for further calibrating the mirror 14 to a completely flat or other desired shape.

After completion of the mechanical adjustment of the support of the deformable mirror 14 by the set screws 94, 96, it is preferred that any conventional means be used to lock the set screws 94, 96 in their adjusted positions, such as Loctite®, or other material to fill the hole above the set screws. As an alternative, the set screws 94, 96 may be of a self-locking type to avoid tampering or inadvertent changes in the adjusted positions of the screws.

By the present invention, an apparatus and system for accurately and adjustably mounting a deformable curvature mirror is provided and a specific example thereof has been described and shown, but it will readily appear to those skilled in the art that the mounting apparatus and it's components may be modified or varied, only some of which modifications and variations have been described above, without departing from the invention as hereinafter claimed.

What is claimed:

1. A mounting apparatus for a deformable mirror having a peripheral mounting portion with oppositely-facing and parallel first and second mounting surfaces, comprising:
    a base member having an o-ring mounted in a peripheral portion juxtaposed to the first mounting surface of the mirror;
    a mounting ring having an o-ring mounted in a peripheral portion juxtaposed to the second mounting surface of the mirror;
    means for securing said mounting ring to said base member; and
    a plurality of screws threadedly mounted in at least one of said base member and said mounting ring, said screws engaging at least one of said o-rings for applying an adjustable mounting force on said brings toward the mirror mounting surfaces.

2. The mounting apparatus of claim 1, wherein said base member and said mounting ring each have a groove in which said o-rings are mounted.

3. The mounting apparatus of claim 2, wherein each said o-ring groove is of a depth smaller than the thickness of the o-ring mounted therein.

4. The mounting apparatus of claim 1, wherein centering means are provided in said base member for adjustably centering the mirror within the base member.

5. The mounting apparatus of claim 4, wherein said centering means comprises a second plurality of screws threadedly mounted in a perimeter of the base member for engaging a perimeter edge of the mirror.

6. The mounting apparatus of claim 5, wherein said second plurality of screws comprises three screws equally spaced around the base member perimeter.

7. The mounting apparatus of claim 5, wherein said second plurality of screws have soft tips for engaging the perimeter edge of the mirror.

8. The mounting apparatus of claim 1, 2, 3, 4, 5, 6 or 7, wherein said plurality of screws engaging at least one of said o-rings are provided in both said base member and said mounting ring.

9. The mounting apparatus of claim 8, wherein said plurality of screws engaging said o-rings are arranged in juxtaposed pairs such that each said screw in said base member is directly opposite a said screw in said mounting ring.

10. A mounting apparatus for a deformable mirror having a peripheral mounting portion with oppositely-facing and parallel mounting surfaces, comprising:
    a base member and a mounting ring for securing to the base member with the mirror therebetween;
    said base member having a peripheral portion juxtaposed to one mounting surface of the mirror;
    said mounting ring having a peripheral portion juxtaposed to the other mounting surface of the mirror;
    a first pliable means positioned between said base member peripheral portion and the one juxtaposed mirror mounting surface;
    a second pliable means positioned between said mounting ring peripheral portion and the other juxtaposed mirror mounting surface;
    a plurality of adjustable means mounted in said peripheral portions of said base member and said mounting ring, said adjustable means mounted in said base member being juxtaposed to said adjustable means mounted in said mounting ring, and each said adjustable means engaging one of said pliable means and being adjustable in a direction perpendicular to the parallel mounting surfaces of the mirror for applying and adjusting a mounting force through said pliable means to the mirror mounting surfaces; and
    centering means in the base member peripheral portion for engaging and centering the mirror.

11. The mounting apparatus of claim 10, wherein at least one of said first and second pliable means is comprised of separate pliable elements located at each said adjustable means.

12. The mounting apparatus of claim 10, wherein at least one of said first and second pliable means comprises an o-ring.

13. The mounting apparatus of claim 10, wherein said plurality of adjustable means comprise set screws.

14. The mounting apparatus of claim 10, wherein said centering means comprises a plurality of screws threadedly mounted in a perimeter of said base member for engaging a perimeter edge of the mirror.

15. The mounting apparatus of claim 14, wherein said plurality of screws mounted in the perimeter of said base member comprises three screws equally spaced around the base member perimeter.

16. The mounting apparatus of claim 14 or 15, wherein said screws mounted in the perimeter of said base member have soft tips for engaging the perimeter edge of the mirror.

* * * * *

UNITED STATES PATENT AND TRADEMARK OFFICE
CERTIFICATE OF CORRECTION

PATENT NO. : 6,568,647 B2  Page 1 of 1
DATED : May 27, 2003
INVENTOR(S) : J. Elon Graves and Malcolm J. Northcott It is certified that error appears in the above-identified patent and that said Letters Patent is hereby corrected as shown below:

<u>Column 7,</u>
Line 55, please replace "brings" with -- o-rings --.

Signed and Sealed this

Eighth Day of July, 2003

JAMES E. ROGAN
*Director of the United States Patent and Trademark Office*